Aug. 20, 1935.  A. P. BALL  2,011,965
TRUCK BODY CONSTRUCTION
Filed Oct. 6, 1930   4 Sheets-Sheet 1
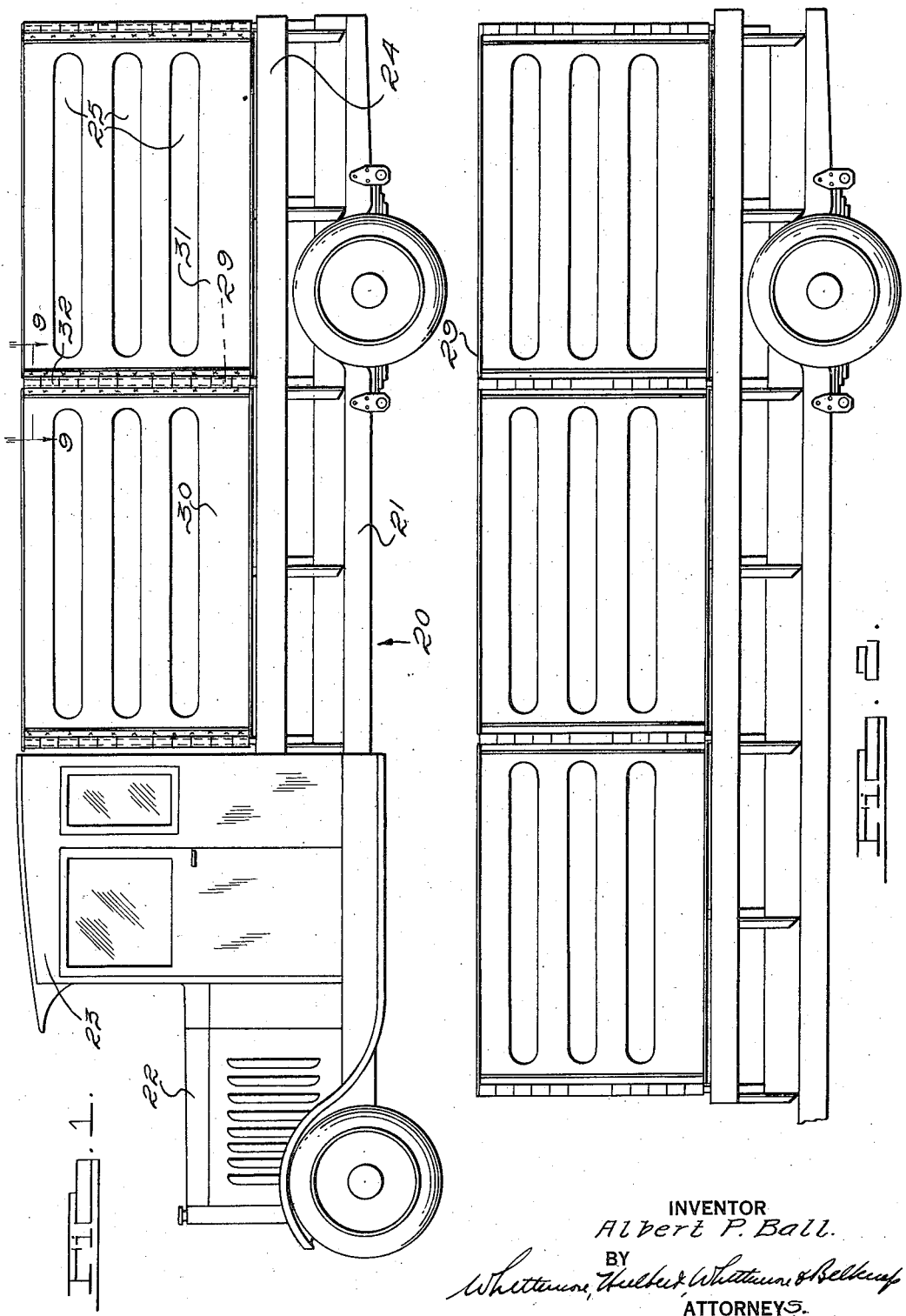
INVENTOR
Albert P. Ball.
BY
ATTORNEYS.

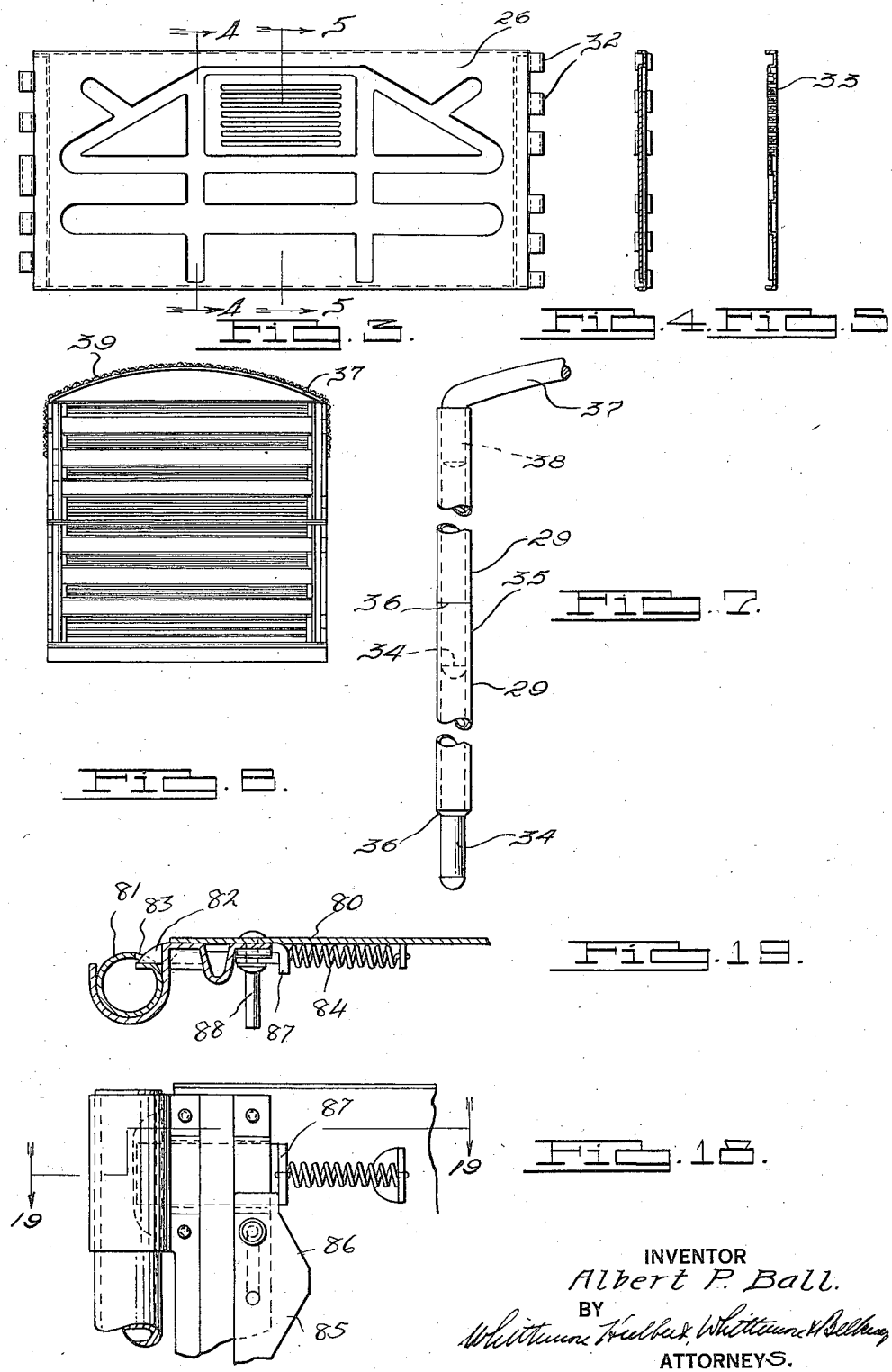

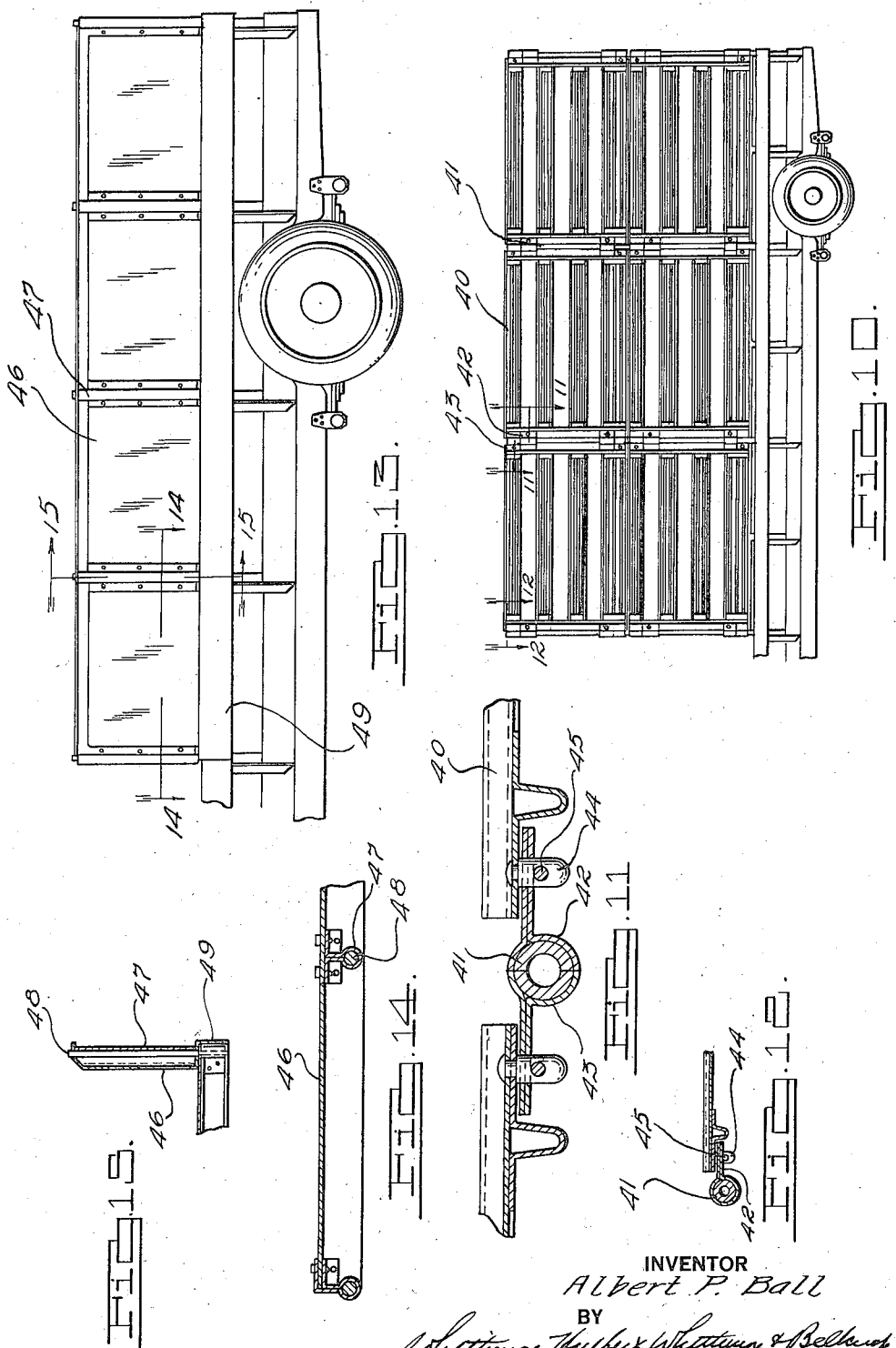

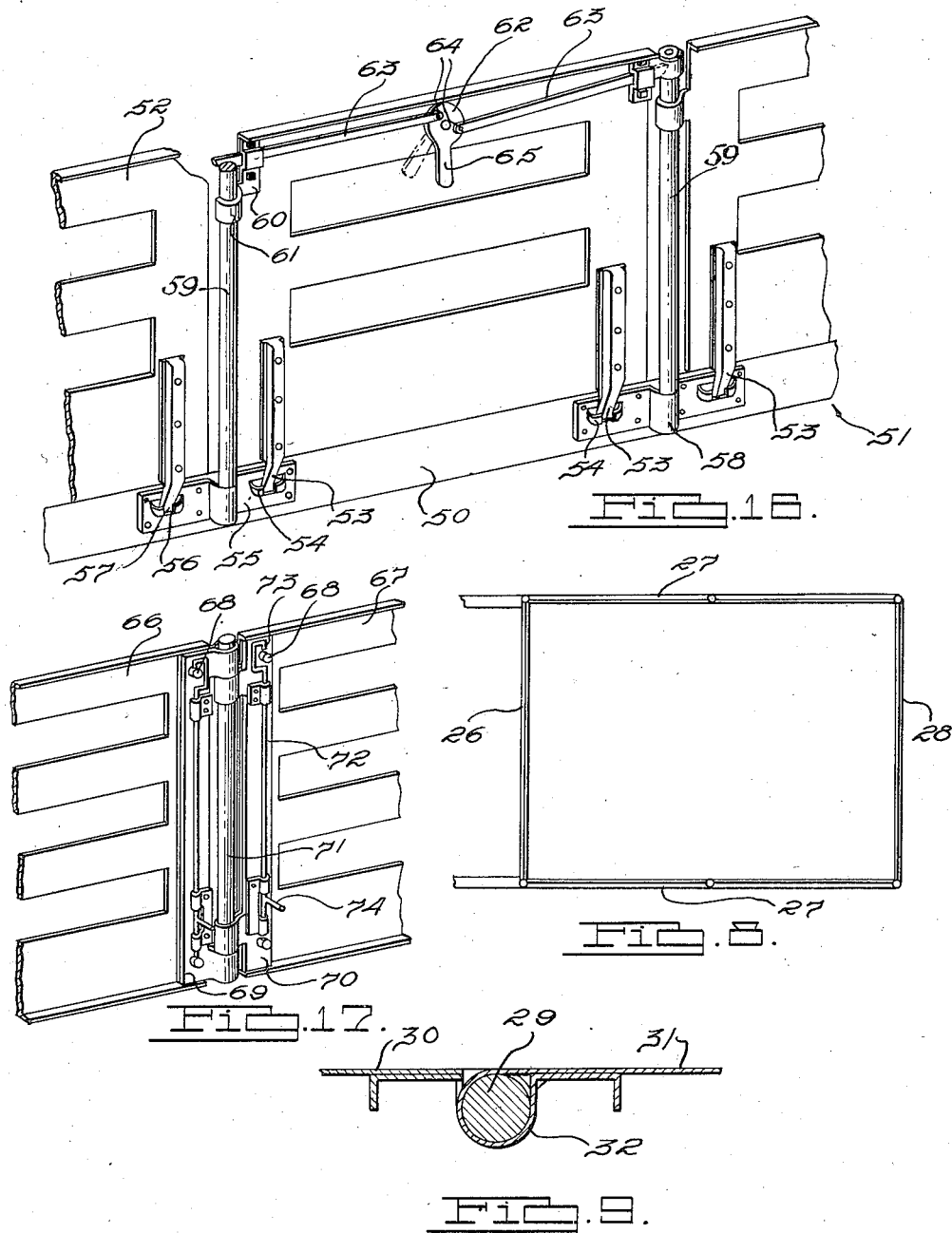

Patented Aug. 20, 1935

2,011,965

UNITED STATES PATENT OFFICE 2,011,965

TRUCK BODY CONSTRUCTION

Albert P. Ball, Detroit, Mich., assignor to Briggs Manufacturing Company, Detroit, Mich., a corporation of Michigan Application October 6, 1930, Serial No. 486,826

6 Claims. (Cl. 296—27)

This invention relates generally to truck body constructions and refers more particularly to an improved construction of storage compartment for truck bodies.

One of the principal objects of this invention is to provide a truck body with a storage compartment having side walls mounted upon the body in such a manner as to permit the same to be swung to open position for loading purposes or to be readily detached from the truck platform in the event it is desired to eliminate the side walls or to substitute walls of a different character.

Another advantageous feature of this invention is attributed to the novel and expedient manner in which the dimension of the storage compartment may be varied. The construction is such that in the event it is desired to increase the height of the storage compartment, sections of the desired widths are merely attached to the side walls of the compartment to form extensions therefor.

A further object of this invention resides in the means employed for detachably and hingedly connecting the side walls of the storage compartment to the truck platform.

With the foregoing as well as other objects in view, the invention resides in the peculiar construction of the truck body illustrated and about to be described.

In the drawings:

Figure 1 is a side elevational view of a truck equipped with a body constructed in accordance with this invention;

Figure 2 is a fragmentary side elevational view illustrating the relatively simple manner in which the length of the body may be varied;

Figure 3 is a side elevational view of one of the body sections;

Figure 4 is a sectional view taken substantially on the line 4—4 of Figure 3;

Figure 5 is a sectional view taken on the line 5—5 of Figure 3;

Figure 6 is an end elevational view of the body construction illustrating the manner in which the height of the body may be varied by adding side wall sections;

Figure 7 is a detail elevational view of one of the side wall supporting sections;

Figure 8 is a diagrammatic plan view of the construction shown in Figure 1;

Figure 9 is a sectional view taken substantially on the line 9—9 of Figure 1;

Figure 10 is a fragmentary elevational view of a slightly modified form of body construction;

Figure 11 is a sectional view taken substantially on the line 11—11 of Figure 10;

Figure 12 is a sectional view taken on the line 12—12 of Figure 10;

Figure 13 is a view similar to Figure 10 showing still another modified form of construction;

Figure 14 is a sectional view taken on the plane indicated by the line 14—14 of Figure 13;

Figure 15 is a sectional view taken on the line 15—15 of Figure 13;

Figure 16 is a fragmentary perspective view of another modified form of body construction;

Figure 17 is a view similar to Figure 16 showing still another modified form of body construction;

Figure 18 is a fragmentary side elevational view of a latch mechanism; and

Figure 19 is a sectional view taken on the line 19—19 of Figure 18.

Generally described, there is illustrated in Figure 1 a truck 20 comprising a chassis 21 having a motor compartment 22 and a driver's compartment 23 supported thereon adjacent the forward end thereof. Supported upon the chassis frame 21 in rear of the driver's compartment 23 is a platform 24 forming the floor for the storage compartment 25. The storage compartment 25 is provided with front, side and rear walls 26, 27 and 28, respectively, which extend upwardly from the platform 24 and are supported on the latter by means of the stanchions or stakes 29. The opposite side walls 27 of the storage compartment are preferably formed of a plurality of sections, herein shown as two, 30 and 31. The sections 30 and 31 are detachably connected to the stanchions 29 in such a manner as to permit any number of sections to be secured together to form different lengths of bodies depending upon the chassis construction.

In detail, opposite ends of each side wall section is provided with laterally extending aligned tubular projections 32. The tubular projection on each section being spaced longitudinally of the ends of the section a sufficient distance to receive therebetween the tubular projections on the next adjacent section as clearly shown in Figures 1 and 2. When the tubular projections 32 of adjacent sections are in assembled relation, they cooperate to form an axially extending opening of sufficient diameter to slidably receive the stakes 29. Thus, it will be seen that the stakes 29, in addition to supporting the side walls of the storage compartment from the platform 24 of the truck, also serve to detachably connect the side wall sections to each other. The lower ends of the stakes 29 are detachably received in suitable stake pockets formed on the platform 24. The above construction is such as to permit the side wall sections to be readily detached from the stakes 29 to permit the substitution of side walls of different construction or if it is desired to eliminate the side walls entirely, the stakes 29 may also be readily removed from the platform. The front and rear wall sections 26 and 28 of the storage compartment are secured to the stakes 29 in the same manner as the side wall sections and as shown in Figure 3, the front wall section 26 may be provided with suitable openings 33 therein to permit the operator to see into the storage compartment.

As shown in Figures 6 and 7, the height of the storage compartment may be readily increased by merely telescopically engaging two or more of the stanchions 29 with each other and assembling a wall section upon each stanchion in the same manner as hereinbefore described. In detail, the stanchions 29 are provided at the lower ends thereof with reduced circular portions 34 adapted to slidably engage within the stake receiving pockets formed on the platform and are provided at the upper ends with tubular socket portions 35 having an interior diameter sufficient to slidably receive the reduced end portions 34. Thus, it will be seen that the reduced end portions 34 of the stanchions are not only adapted to engage within the stake-receiving pockets on the platform, but are also engageable within the socket portion of other stanchions to form extensions therefor. As shown particularly in Figure 7, when the reduced end portion 34 of one stanchion is telescopically engaged within the tubular upper end of another stanchion, the shoulder 36 formed by the reduced portion 34 of the upper stanchion seats upon the upper end of the lowermost stanchion forming, in effect, a single upright member of the combined length of both stanchions. With the above construction, it will be observed that the side walls of the storage compartment may be readily increased to substantially any desired height by merely adding sections, and this may be accomplished without detaching or otherwise interfering with the side wall sections previously assembled on the truck.

The foregoing construction, in addition to providing simple and efficient means for increasing the height of the storage compartment, also renders it possible to provide a readily detachable top for the storage compartment. Referring again to Figures 6 and 7, it will be noted that in the event it is desired to provide a top for the storage compartment a plurality of rods 37 are provided having upwardly bowed portions extending transversely of the storage compartment and terminating at the ends in depending projections 38 adapted to telescopically engage within the tubular socket portions of the uppermost stanchions. Suitable top covering 39 may then be extended across the rods 37 and suitably secured in place.

Referring now to the modified form of construction illustrated in Figures 10 to 12, inclusive, it is to be noted that this construction differs from the one previously described in that the sections 40 cooperating with each other to form the side walls of the storage compartment are connected to the stanchions 41 in such a manner as to permit the same to be individually swung to open position. In detail, each of the stanchions 41 are provided with oppositely extending hinge parts 42 and 43 independently rotatably mounted upon the stanchions and adapted to be alternatively connected to the adjacent ends of a pair of adjacent sections. The connection between the ends of the side wall sections and hinge parts 42 and 43 are preferably of a readily detachable nature so as to render it possible to detach one end of each section from the adjacent stanchion and thereby permit the sections to swing about the opposite ends thereof. The particular connection illustrated in Figures 10 to 12, inclusive, comprises a projection 44 extending laterally from the four corners of each wall section and adapted to project through suitable slots formed in the hinge parts 42 and 43. As shown in Figure 12, each of the projections 44 are provided with openings therein for receiving pins 45 which serve to hold the various wall sections in assembled relation with the stanchions. The foregoing construction is such that the sections may be independently detached from the stanchions by merely removing the pins 45 and disengaging the projections 44 from within the slots formed in the hinge parts 42 and 43. The stanchions 41 may be identical in construction to the stanchions 29, described above, with the result that the side walls of the storage compartment may be readily extended by merely adding additional sections.

The body construction illustrated in Figures 13 to 15, inclusive, differs from either of the foregoing described types in that the side walls 46 of the storage compartment are preferably continuous rather than formed in sections. As will be observed from the above figures, the side walls 46 are in the form of a sheet metal stamping having brackets 47 secured thereto at longitudinally spaced intervals for slidably receiving the stanchions 48 extending upwardly from the truck platform 49.

In Figure 16, I have illustrated another modified form of body construction wherein each of the side wall sections are independently hingedly connected to the side sills 50 of the platform 51 so as to permit the sections to be individually swung downwardly for the purpose of facilitating loading and unloading of the truck. In detail, each of the side wall sections 52 are provided with downwardly extending projections 53 adjacent opposite ends thereof and adapted to be received in suitable upwardly opening pockets 54 struck out from plates 55 which are secured to the outer sides of the sills 51 in any suitable manner. The pockets 54 are preferably cut away as indicated at 56 to receive the reduced portion 57 of the projections 53 when the sections 52 are swung to their open position. Each of the plates 55 are also formed with a third pocket 58 intermediate the pockets 54 for detachably receiving the stakes or stanchions 59. The upper ends of the sections 52 are provided with brackets 60 having laterally extending arcuate projections 61 adapted to engage the stanchions 59 to prevent inward movement of the sections 52. Cooperating with the arcuate extensions 61 and associated with each section 52 for normally maintaining the sections in assembled position upon the platform is a suitable latching device 62 comprising a pair of levers 63 having their inner ends pivotally connected as at 64 to an operating handle 65 in such a manner that rotation of the handle 65 in one direction causes the levers 63 to move toward each other and rotation of the handle in an opposite direction affects movement of the levers away from each other. The outer end portions of the levers 63 are guided by the brackets 60 and are adapted, when in the position shown in Figure 16, to extend behind the stanchions 59 to prevent outward movement of the sections 52. The construction is such that the sections 52 may be swung to inoperative position by merely manipulating the handle 65 to disengage the outer ends of the levers 63 from the stanchions 59. Moreover, since the projections 57 on each of the sections 52 merely rest within the pockets 54, the sections 52 may be readily detached from the truck whenever desired.

In Figure 17, I have shown a modified form of detachable hinge connection between the sections and stanchions. As shown in this figure, the adjacent ends of a pair of sections 66 and 67 are provided with laterally extending projections 68 at the top and bottom edges thereof adapted to extend through suitable openings formed in a pair of hinge parts 69 and 70 mounted for rotation independent of each other upon the stanchion 71. The projections 68 are normally maintained in assembled relation with the hinge parts 69 and 70 by means of suitable sliding bolts 72 carried by the hinge parts. The upper ends of the bolts 72 terminate in downwardly extending projections 73 adapted to engage in suitable openings formed in the projection 68, while the lower ends of the bolts 72 are adapted to engage in similar openings formed in the lowermost projections 68. Each of the bolts 72 are provided with laterally extending handle portions 74 which may be conveniently grasped to manipulate the bolts. The construction is such that movement of the bolts upwardly causes the same to disengage from the projections 68 and permit the adjacent edges of the sections 66 and 67 to be detached from the hinge parts 69 and 70 and thereby permit the same to be pivoted about their opposite ends assuming that a similar connection between the latter ends and truck is provided. It will further be seen that the sections may be independently released from the stanchion 71 by merely manipulating only one of the bolts 72. Moreover, by virtue of the above construction, by releasing the bolts at opposite ends of each section, the latter may be entirely removed from the truck and since the stanchions 71 are preferably mounted within stake-receiving pockets upon the truck platform, as stated in connection with the construction illustrated in Figure 16, the stanchions and hinge parts may also be readily removed from the truck platform. In this connection it is to be noted that the stanchions 71 may be identical in construction to the stanchions 29, hereinbefore described, if desired, with the result that the width of the side walls of the storage compartment shown in Figure 17 may be extended by adding the desired number of sections.

In Figures 18 and 19, I have illustrated a modified form of latch mechanism for retaining the side wall sections 80 in assembled relation with the stanchions 81. The latch mechanism comprises a longitudinally slidable bolt 82 carried by the side wall section 80 and adapted to engage within a keeper 83 formed by striking a portion of the tubular stanchion 81 inwardly as clearly shown in Figure 19. The bolt 82 is normally held in engagement with the keeper 83 by means of a suitable spring 84 having one end anchored to the side wall section 80 and the opposite end secured to the bolt. For moving the bolt out of latching position, I provide a vertically slidable cam member 85 carried by the wall section 80 and having a cam surface 86 adapted to engage an outwardly projecting shoulder 87 formed on the end of the bolt for moving the latter out of the keeper 83. The cam may be conveniently manipulated by means of an operating handle 88 secured to the cam 85.

What I claim as my invention is:

1. A truck body having a platform, an upright member anchored in the platform, a wall section extending upwardly from the platform and swingingly mounted on said upright member, said upright member having a socket portion at the upper end thereof for detachably receiving a second upright member substantially the same in construction as the member aforesaid, and a second wall section swingingly mounted on the second upright member.

2. A truck having a platform, an upright member mounted on the platform, a wall section having spaced looped portions receiving said upright member and supported thereby, a second upright member detachably engageable with the upright member aforesaid forming an extension therefor, and a second wall section substantially the same in construction as the first mentioned wall section arranged in vertical alignment therewith and supported by said second upright member.

3. A truck having a platform, a wall formed of a plurality of sections extending upwardly from the platform and having spaced looped portions, a plurality of stanchions extending upwardly from the platform between the adjacent edges of the sections and engageable in the looped portions thereof, a second series of stanchions telescopically and detachably engaging the stanchions aforesaid, and other wall sections having spaced looped portions engaging said last mentioned stanchions to form a continuation of the first mentioned wall sections.

4. A truck having a platform, a wall formed of a plurality of sections extending upwardly from the platform and having spaced looped edge portions, stanchions detachably mounted upon the platform and extending upwardly therefrom between adjacent edges of the sections and engaging in said looped edge portions, said stanchions each having a socket portion at the upper end thereof, other stanchions detachably mounted in the socket portions of the first mentioned stanchions to form extensions therefor, and wall sections having spaced looped edge portions engaging the second mentioned stanchions in vertical juxtaposition to the first mentioned wall sections.

5. A truck body having a platform, an upright member anchored in the platform, a wall section extending upwardly from the platform and swingingly mounted on said upright member, said upright member having a socket portion at the upper end thereof for detachably receiving a second upright member substantially the same in construction as the member aforesaid, a second wall section swingingly mounted on the second upright member, and a top supporting member extending transversely of the platform and having a portion adapted to telescopically engage in the socket of either said first or said second upright member.

6. A truck having a platform, a stanchion receiving pocket in said platform, a tubular stanchion having a reduced portion at one end engageable in said pocket, a socket in the opposite end of said stanchion equal in size to said stanchion receiving pocket, other stanchions interchangeable with and adapted to form extensions for said first mentioned stanchion, and a top supporting member extending transversely of the platform and having a portion adapted to telescopically engage in the socket of any one of said stanchions.

ALBERT P. BALL.